United States Patent
Giraud et al.

(10) Patent No.: US 10,059,166 B2
(45) Date of Patent: Aug. 28, 2018

(54) ASSEMBLY COMPRISING A GENERATOR AND ELECTRIC MOTORS, FOR A VEHICLE COOLING OR AIR-CONDITIONING SYSTEM

(71) Applicant: MOTEURS LEROY-SOMER, Angouleme (FR)

(72) Inventors: Régis Giraud, Angouleme (FR); Stéphane Dedieu, Angouleme (FR)

(73) Assignee: MOTEURS LEROY-SOMER, Angouleme (FR)

( * ) Notice: Subject to any disclaimer, the term of this patent is extended or adjusted under 35 U.S.C. 154(b) by 0 days.

(21) Appl. No.: 14/415,902

(22) PCT Filed: Jul. 17, 2013

(86) PCT No.: PCT/IB2013/055886
§ 371 (c)(1),
(2) Date: Jan. 20, 2015

(87) PCT Pub. No.: WO2014/013458
PCT Pub. Date: Jan. 23, 2014

(65) Prior Publication Data
US 2015/0202943 A1    Jul. 23, 2015

(30) Foreign Application Priority Data
Jul. 19, 2012    (FR) ..................... 12 57008

(51) Int. Cl.
*B60H 1/00* (2006.01)
*B60H 1/32* (2006.01)

(52) U.S. Cl.
CPC ....... *B60H 1/00428* (2013.01); *B60H 1/3208* (2013.01); *B60H 1/3222* (2013.01);
(Continued)

(58) Field of Classification Search
CPC ............. B60H 1/00428; B60H 1/3208; B60H 1/3222; B60H 1/3226; B60H 2001/3292;
(Continued)

(56) References Cited

U.S. PATENT DOCUMENTS 3,034,035 A    5/1962   Baumann et al.
4,530,338 A *  7/1985   Sumi ...................... F02B 39/12
                                                    123/198 R
(Continued)

FOREIGN PATENT DOCUMENTS

DE    102008004269 A1 *  7/2009   ............. B60L 11/12
EP        1829721 A2       9/2007

OTHER PUBLICATIONS

Dec. 12, 2013 International Search Report issued in International Application No. PCT/IB2013/055886.
(Continued)

*Primary Examiner* — Emmanuel Duke
(74) *Attorney, Agent, or Firm* — Oliff PLC

(57) ABSTRACT

The invention relates to an assembly including: a heat engine; a generator, the shaft of which is rotated by the heat engine; one or more electric motors for the evaporators of a vehicle cooling or air-conditioning system, the generator powering the electric evaporator motor(s) by an inverter; one or more electric motors for the condenser of the cooling or air-conditioning system, in which the motors include a four-pole rotor, the generator directly powering the condenser motor(s) and the supply voltage of the condenser motor(s) being the generator output voltage; a compressor which is driven mechanically by the heat engine; and an auxiliary electric motor for driving the compressor when it is not being driven by the heat engine.

11 Claims, 3 Drawing Sheets

(52) U.S. Cl.
  CPC ... *B60H 1/3226* (2013.01); *B60H 2001/3272* (2013.01); *B60H 2001/3292* (2013.01); *Y02T 10/88* (2013.01)

(58) Field of Classification Search
  CPC .............. B60H 2001/3272; H02M 5/42; F02B 63/042; F04B 27/0895
  USPC ........................................................ 363/86
  See application file for complete search history.

(56) References Cited

U.S. PATENT DOCUMENTS

| | | | | |
|---|---|---|---|---|
| 4,870,833 | A * | 10/1989 | Matsuda | B60H 1/00428 62/134 |
| 6,223,546 | B1 * | 5/2001 | Chopko | B60H 1/3232 62/243 |
| 6,392,371 | B1 * | 5/2002 | Cheng | H02K 19/26 318/158 |
| 6,400,107 | B1 * | 6/2002 | Nakatani | H02P 6/085 318/400.21 |
| 2002/0056993 | A1 * | 5/2002 | Kennedy | B60R 16/04 290/1 A |
| 2002/0105819 | A1 * | 8/2002 | Giraud | H02K 19/36 363/86 |
| 2002/0108388 | A1 | 8/2002 | Wilson et al. | |
| 2003/0000236 | A1 * | 1/2003 | Anderson | B60H 1/00421 62/228.3 |
| 2005/0044873 | A1 * | 3/2005 | Tamai | B60H 1/004 62/323.1 |
| 2006/0250107 | A1 | 11/2006 | Jadric et al. | |
| 2008/0012445 | A1 * | 1/2008 | Abe | H02K 1/06 310/216.018 |
| 2008/0083238 | A1 | 4/2008 | Sandkoetter | |
| 2009/0115279 | A1 * | 5/2009 | Spaggiari | H02K 1/276 310/156.53 |
| 2009/0314019 | A1 * | 12/2009 | Fujimoto | B60H 1/3222 62/228.5 |
| 2010/0000241 | A1 | 1/2010 | Kitano et al. | |
| 2010/0045105 | A1 | 2/2010 | Bovio et al. | |
| 2010/0171364 | A1 * | 7/2010 | Awwad | B60H 1/3226 307/9.1 |
| 2014/0020414 | A1 * | 1/2014 | Rusignuolo | B60H 1/00364 62/115 |
| 2014/0026599 | A1 * | 1/2014 | Rusignuolo | F25B 49/025 62/56 |

OTHER PUBLICATIONS

Dec. 12, 2013 Written Opinion issued in International Application No. PCT/IB2013/055886.

* cited by examiner

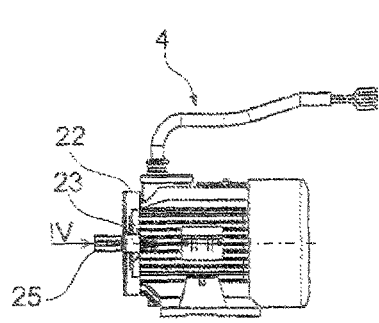
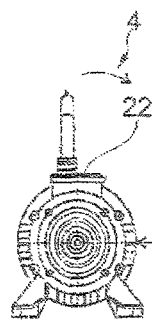
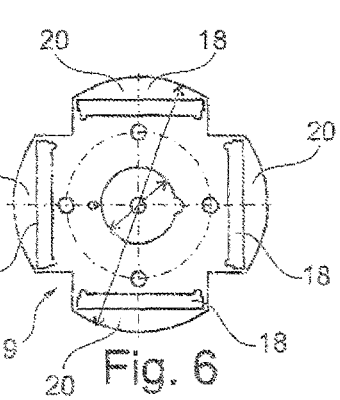
Fig. 5  Fig. 4  Fig. 6
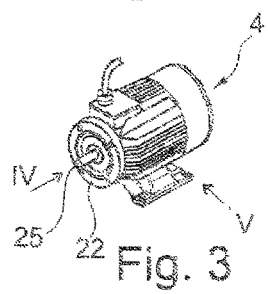
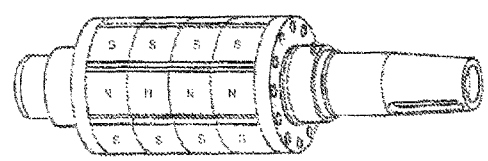
Fig. 3  Fig. 6a
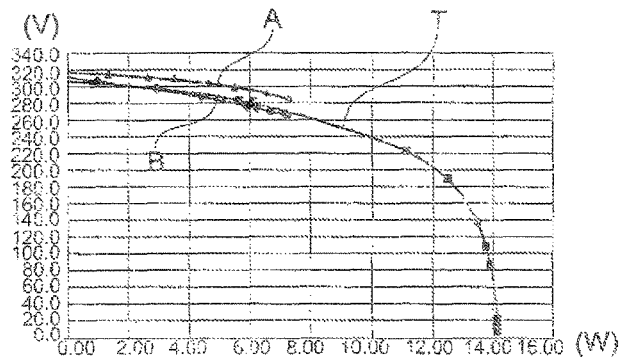
Fig. 10
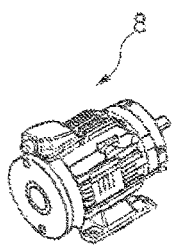
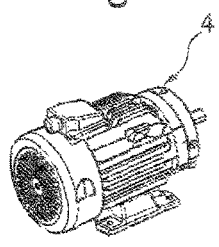
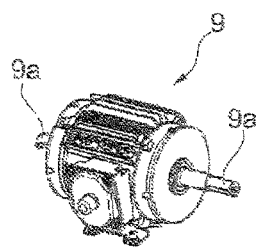
Fig. 8  Fig. 7  Fig. 9

ASSEMBLY COMPRISING A GENERATOR AND ELECTRIC MOTORS, FOR A VEHICLE COOLING OR AIR-CONDITIONING SYSTEM

The present invention concerns the production of electricity from an assembly comprising an internal combustion engine and an electricity generating device for powering one or more electric motors.

There is a need to simplify and facilitate the drive of the cooling or air-conditioning system and reduce the cost of the electricity generating device.

The invention is aimed in particular at meeting this need and its object is therefore an assembly comprising:
- an internal combustion engine,
- a generator, the shaft of which is driven in rotation by the internal combustion engine, and
- one or more electric motors, in particular for
- a vehicle cooling or air-conditioning system, the generator powering the electric motor(s) via at least one inverter.

The presence of at least one inverter upstream of the electric motors allows them to function despite a variation in speed of the internal combustion engine, at least under certain speed conditions, for example over a particular range.

Thus in the invention a continuous bus is used to supply the inverter which, from the direct current, provides an alternating current to power the electric motors.

The electric motor(s) may each serve to drive a fan and be a motor for a condenser and/or evaporator. The absence of any mechanical drive of the fan(s) of the condenser and/or evaporator allows control of the speed of the electric fans irrespective of the speed of the internal combustion engine.

The presence of the inverter improves the efficiency of the fan(s) as a function of the rotation speed of the internal combustion engine.

The presence of an inverter allows a variation in rotation speed of the motor(s) and hence consequently enables the airflow to be controlled and adjusted as a function of the operating conditions. This allows amongst others avoidance of the need to regulate the electrical power, and hence gives more energy-efficient systems.

The presence of the inverter also allows greater flexibility in the design of the motor(s). For example, the number of motor poles can be selected to optimize the mass of raw material, for example a four-pole motor driven at 100 Hz will have around half the active material of a two-pole motor powered at 50 Hz. Also the range of technologies available for the motors can be widened, and permanent magnet motors can be used which have a better energy efficiency.

In one exemplary embodiment, the assembly comprises an inverter arranged upstream of one of the evaporator and/or condenser motors, so as to allow adaptation of the rotation speed of the evaporator fan and/or the condenser fan.

In another exemplary embodiment, the assembly comprises several inverters upstream of each or several condenser and/or evaporator motors. The assembly may for example comprise a first inverter upstream of the condensers, and a second inverter upstream of the evaporators.

In a variant embodiment, the assembly also comprises a voltage regulator to regulate the generator output voltage which varies with the generator drive speed. The presence of the regulator allows operation at variable speed over a wide speed range. The presence of the regulator may thus allow an energy-efficient assembly to be created. The regulator may comprise an AC/DC converter, the inverter acting as a DC/AC converter.

In one exemplary embodiment, the assembly comprises a speed variator powered by the generator and controlling the fan speed of the condensers, evaporators and any electrical compressor.

The assembly may comprise a device for switching the supply of the electric motor(s), allowing switching from a supply by the generator to a supply by an external electrical network. In this case, the motor(s) are connected to the network via said at least one inverter and the generator is then isolated.

The switching device may be configured to trigger only when the vehicle has stopped, which avoids the pollution which may be caused by the operation of the internal combustion engine while at a standstill. This switching device may comprise one or more switches allowing the supply of the electric motor(s) to be controlled from the external electrical network. The or each switch may comprise one or more electronic components. The or each switch may be produced by any suitable means, and for example using one or more electromechanical or semiconductor switches, for example with contactor(s), relay(s), thyristor(s), triac(s), IGBT or bipolar transistor(s).

The motor(s) may function on an external electrical network such as a network with 230 V and 60 Hz, or 460 V and 60 Hz, or again 400 V et 50 Hz. Thus these motors can function on electrical networks throughout the entire world, as they can be adapted to any place of use and the characteristics of the local electrical network. The presence of a variator allows absorption of voltage variations upstream and hence avoids the need for specific motors for each voltage used in the world.

The assembly may for example comprise a compressor. The latter may be driven mechanically by the internal combustion engine. The drive may take place by pulley-belt system. The assembly need not have a compressor driven by an electric motor, at least in normal operation of the assembly.

The assembly may also comprise an auxiliary electric motor for driving the compressor when the latter is not or cannot be driven by the internal combustion engine. The drive may also take place by pulley-belt system. This auxiliary electric motor may be powered from the external electrical network.

As a variant or in addition, the assembly may comprise an electrical compressor powered by the generator. The compressor may comprise an electrical motor for the compressor and a pump driven by said motor, both being arranged in a sealed housing. In other words, the assembly may comprise a hermetic compressor. The electrical compressor may be powered by the generator through an inverter and/or a voltage regulator and/or a speed variator.

The assembly may comprise no batteries.

As a variant, the assembly may comprise energy storage means, in particular a battery. The presence of an energy storage means may facilitate the starting of the compressor during starting of the assembly, wherein the compressor may be powered initially by the energy storage device. This allows compensation for a possible stoppage of the internal combustion engine and allows the compressor to be started during starting of the internal combustion engine. This may also allow shortening of the speed buildup phase of the internal combustion engine.

The assembly may comprise a single condenser or as a variant several condensers, for example two condensers. The assembly may comprise a single evaporator or as a variant several evaporators, for example two evaporators.

The motor(s) may be asynchronous or synchronous motors. They may be three-phase motors. They may be single- or two-speed. When a variator is present, they are single-speed. They may allow similar ventilation performances to be achieved irrespective of the speed of the internal combustion engine. The absorbed power can therefore be limited when the speed of the internal combustion engine is increased.

The motor(s) are preferably asynchronous motors which have a simple structure and are reliable to use.

One or at least one of the motors may comprise a four-pole or a six-pole rotor, which allows function at low speed with low consumed power.

The motor(s) may comprise a fan at each of the free ends of the shaft.

The internal combustion engine may be a diesel engine. The internal combustion engine and the electric motor(s) may belong to a vehicle cooling or air-conditioning system. The internal combustion engine may be distinct from the engine used to propel the vehicle.

The generator is a synchronous machine.

The internal combustion engine may drive the generator shaft via a pulley-belt system. Such a drive by pulley-belt system allows adjustment of the generator output frequency to the speed of the internal combustion engine, so as to allow the use of electric fan motors which can be used directly on the supply network without loss of performance. If the internal combustion engine has a rotation speed of 1600 rpm with a ratio of 1.125 between the pulleys, then the generator, with four poles for example, would be driven at a speed of 1800 rpm and supply an output voltage at 60 Hz like the network, thanks to its synchronous construction which induces no slippage.

The generator may therefore be driven in rotation by the internal combustion engine with a transmission ratio selected such that the frequency supplied by the generator is the same as that of the external electrical network used to power the motor(s) when the vehicle is stopped.

The frequency supplied by the generator may be linked to its rotation frequency N by the formula $f=p*N/2\pi$, wherein p is the number of pairs of poles, and N in rad/s. For a four-pole structure, we have $f=N/\pi$ with $p=2$.

The generator may comprise permanent magnets. The generator rotor may comprise permanent magnets, then being for example a flux concentration or embedded magnet rotor.

The invention will be better understood from reading the detailed description below of non-limitative exemplary embodiments, and from examination of the attached drawing on which:

FIGS. 1 and 2 show diagrammatically an assembly, possibly on-board a vehicle, fitted with an electricity generating device produced in accordance with the invention, FIG. 3 is a perspective view of a generator which may be used in the invention, FIGS. 4 and 5 are views along arrows IV and V respectively of FIG. 3, FIG. 6 is a diagrammatic, partial, cross-section view of the rotor of the generator in FIGS. 3 to 5, FIG. 6a is a diagrammatic, partial, perspective view of the rotor of a variant embodiment of the generator, FIG. 7 is a diagrammatic, partial, perspective view of a variant embodiment of the generator, FIGS. 8 and 9 are diagrammatic, partial, perspective views of the condenser and evaporator motors respectively according to the invention, FIG. 10 shows the variation in output voltage of the generator in Volts in relation to the supplied power in Watts, and FIGS. 11 to 13 are views similar to FIG. 1 of variant embodiments.

FIGS. 1 and 2 show an assembly 1 comprising firstly an internal combustion engine 3 and secondly an electricity generating device 2 with a generator 4, the shaft of which may be driven in rotation by the internal combustion engine 3. The assembly 1 is for example mounted on-board a vehicle. In the example described, the internal combustion engine is a diesel engine.

The assembly also comprises electric motors of a vehicle cooling or air-conditioning system, powered by the electricity generating device 2. In the example described, the assembly comprises two condenser motors 8 and two evaporator motors 9.

The electricity production device 2 is configured so that the generator powers the evaporator electric motors 9 through an inverter 5, so as to allow their operation at variable speed.

With regard to the condensers, they are powered directly by the generator 4, i.e. the supply voltage of the condenser electric motors 8 is the output voltage of the generator 4.

Naturally, it remains within the scope of the present invention if the condenser electric motors 8 are powered through an inverter 5, while the evaporator electric motors 9 are powered directly by the generator 4, i.e. the supply voltage of the evaporator electric motors 9 is the output voltage of the generator 4.

In the example described, the assembly also comprises a device 10 for switching the power supply of the electric motors of the condensers and the evaporators, allowing switching from a supply by the generator, as illustrated in FIG. 1, to a supply by an external electrical network 11, as illustrated in FIG. 2. The switching device 10 comprises switches 12 allowing the supply of the electric motors to be controlled from the electrical network 11.

The assembly also comprises a compressor 15 driven by the internal combustion engine 2, as shown on FIG. 1. The drive may take place by pulley-belt system.

The assembly also comprises, as shown on FIG. 2, an auxiliary electric motor 16 for driving the compressor 15 when the latter is not or cannot be driven by the internal combustion engine. The drive may take place by pulley-belt system.

To this end, the assembly comprises a temporary coupling device 17 between the shaft of the internal combustion engine 3 and the shaft of the compressor 15.

This auxiliary electric motor 16 may be powered from the electrical network 11. Despite the presence of the auxiliary electric motor 16, the assembly has no electrically driven compressor in normal operating mode of the assembly.

The generator 4 is shown in more detail in FIGS. 3 to 6. It may comprise a wound stator with a segmented winding. The rotor may comprise permanent magnets or be wound. In the example described, it comprises a rotor 19 with permanent magnets 18 embedded below the surface of the poles 20, as illustrated in FIG. 6. The rotor shown comprises four poles 20.

The generator comprises a flange 22 allowing the removal of a bearing 23 arranged at the front of the generator.

The internal combustion engine 3 also drives the shaft 25 of the generator 4 by a pulley-belt system, which allows adjustment of the generator output frequency to the speed of the internal combustion engine. The internal combustion engine 3 may drive the generator 4 at a variable speed. For example, when the generator charge is low, the rotation speed of the internal combustion engine 3 is relatively low, and when the generator charge 3 increases, the speed of the internal combustion engine 3 may be increased.

FIG. 7 shows an exemplary embodiment in which the generator 7 comprises a stator with segmented winding and a rotor with embedded permanent magnets and four poles. This generator for example has a power of 3.5 kVA at an operating speed of 1800 rpm.

The generator may comprise 8 poles without leaving the framework of the present invention.

FIG. 8 shows an exemplary embodiment of the condenser motor 8. The motor 8 in this example has a four-pole rotor.

FIG. 9 shows an exemplary embodiment of the evaporator motor 9. The evaporator comprises for example a fan at each of the free ends 9*a* of its shaft.

FIG. 10 shows the variation in output voltage of the generator in Volts in relation to the supplied power in Watts. Curve T illustrates the theoretical values, curve A the values obtained with a generator with embedded permanent magnets as shown in FIG. 6, and curve B with a generator with surface-glued permanent magnets as shown in FIG. 6*a*.

Figure 1:
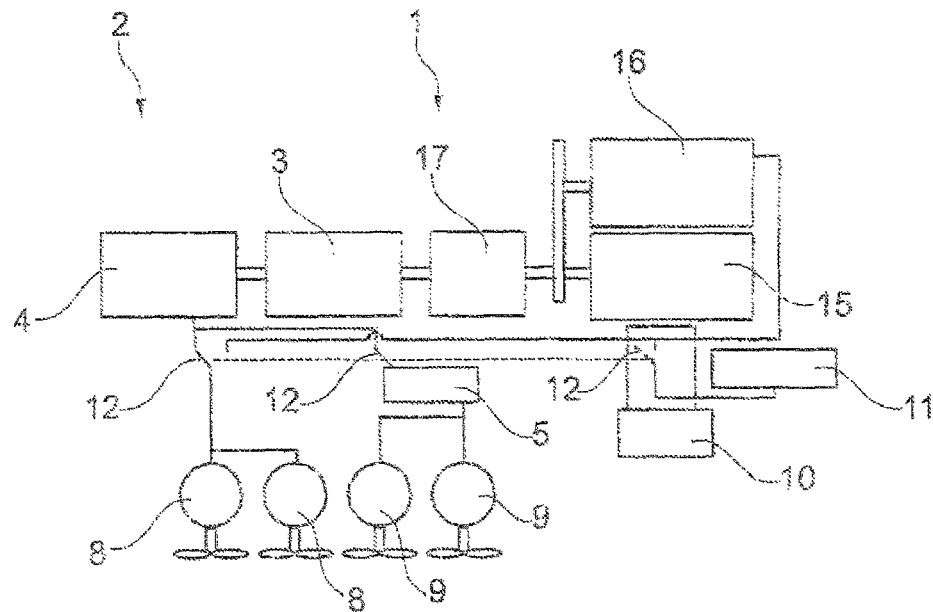
Figure 2:
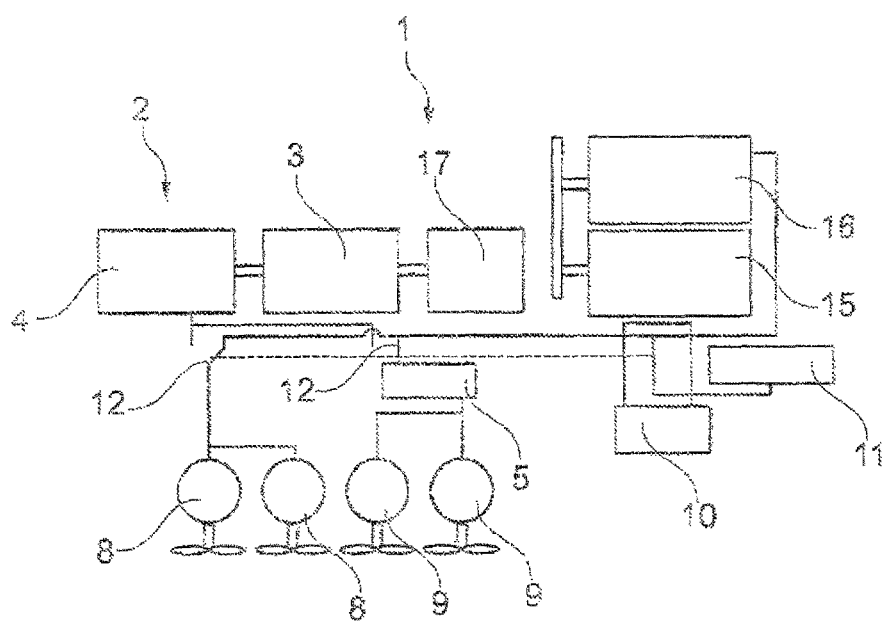
Figure 11:
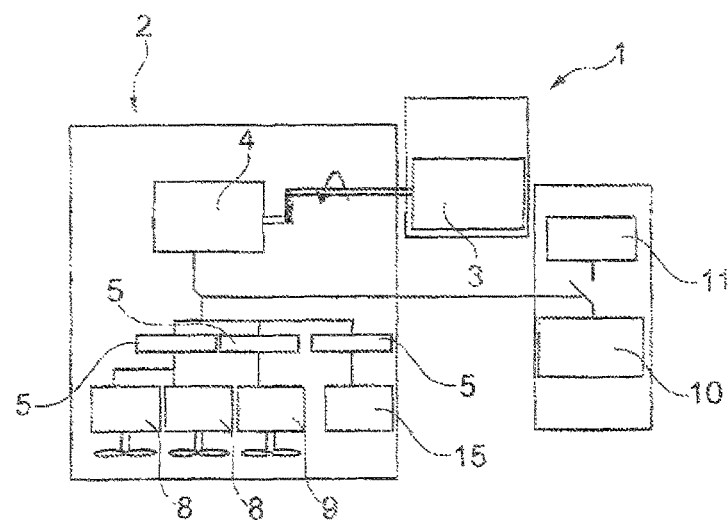

In the description above, at least in normal operating mode of the assembly, the compressor 15 is driven by the internal combustion engine 3. This situation may vary, without leaving the framework of the present invention, if the compressor is powered by the generator 4. As an example, FIG. 11 shows an assembly comprising an electrical compressor 15 powered directly by the generator 4 through an inverter 5. This compressor is called hermetic, i.e. it comprises an electric compressor motor and a pump driven by said motor, both being arranged in a sealed housing.

In this example, the assembly comprises two further inverters 5, one upstream of the condenser motors 8 and the other upstream of the evaporator motor 9. The inverters may be grouped into a single inverter or several inverters, for example two inverters in an example not shown.

Figure 12:
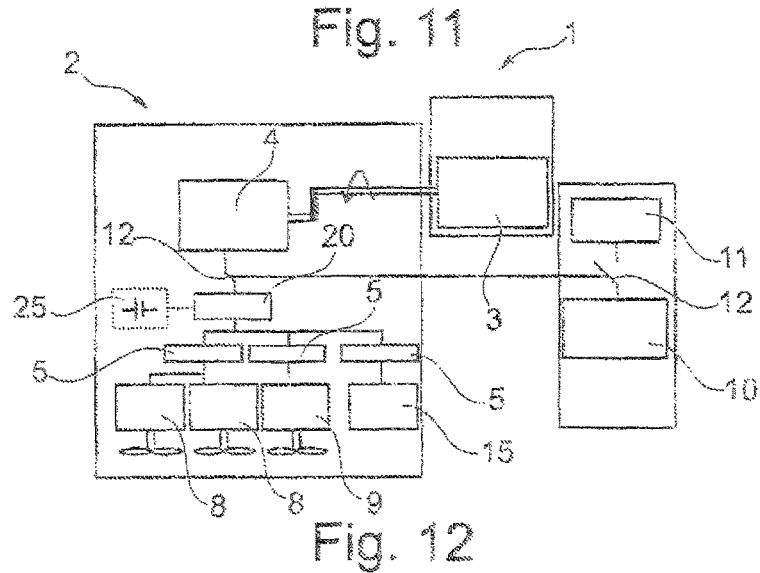

In the variant embodiment shown in FIG. 12, the assembly also comprises a voltage regulator 20. The presence of the regulator allows operation at variable speed over a wide speed range, the generator output voltage varying with the generator speed.

The assembly may also comprise a battery 25, which facilitates starting of the compressor 15 and other components of the system, such as the evaporator(s) or condenser(s), during starting of the assembly, wherein the compressor, evaporator(s) and/or condenser(s) may be powered initially by the battery 25.

Figure 13:
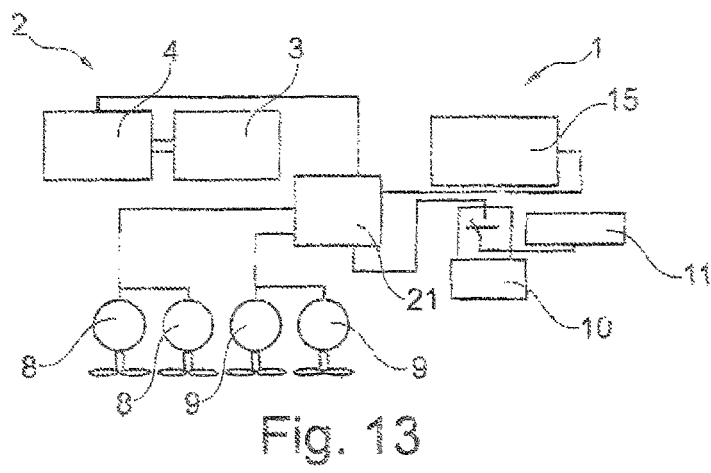

In another variant embodiment shown in FIG. 13, the assembly comprises a speed variator 21 powered by the generator and controlling the fan speed of the condensers, evaporators and the electrical compressor 21.

The expression "comprising a" should be understood as synonymous with "comprising at least one" unless specified to the contrary.

The invention claimed is:

1. An assembly comprising:
    an internal combustion engine,
    a synchronous generator having permanent magnets and having a rotor comprising four poles, and the permanent magnets being embedded below the surface of the poles, the surface of the rotor being cylindrical, a shaft of the generator is driven in rotation by the internal combustion engine by a pulley-belt system, said generator supplying an output voltage with 50 Hz or 60 Hz frequency, the frequency supplied by the generator being linked to its rotation frequency N by the formula: $f=p*N/2\pi$, wherein p is the number of poles and N in rad/s,
    one or more electric motors for evaporators of a vehicle cooling or air-conditioning system, the generator powering the evaporator electric motor(s) via at least one inverter,
    one or more electric motors for a condenser of said cooling or air-conditioning system, said motor(s) comprising a four-pole rotor, the generator directly powering the condenser motor(s), the supply voltage of the condenser motor(s) being the generator output voltage,
    a compressor which is driven mechanically by the internal combustion engine, and
    an auxiliary electric motor for driving the compressor when the latter is not driven by the internal combustion engine.

2. The assembly as claimed in claim 1, the internal combustion engine being a diesel engine.

3. The assembly as claimed in claim 1, the internal combustion engine and the electric motor(s) belonging to the vehicle cooling or air-conditioning system.

4. The assembly as claimed in claim 1, wherein the electric motor(s) serve to drive a fan.

5. The assembly as claimed in claim 1, comprising several inverters upstream of each or several condenser and/or evaporator motors.

6. The assembly as claimed in claim 1, comprising a voltage regulator to regulate the generator output voltage.

7. The assembly as claimed in claim 1, comprising a speed variator powered by the generator and controlling the fan speed of the condensers, evaporators and any electrical compressor.

8. The assembly as claimed in claim 1, comprising a switching device for the power supply of the electric motor(s), allowing switching from a supply by the generator to a supply by an external electrical network.

9. The assembly as claimed in claim 8, the switching device comprising one or more switches allowing the supply of the electric motor(s) to be controlled from the external electrical network.

10. The assembly as claimed in claim 1, comprising an electrical compressor powered by the generator.

11. The assembly as claimed in claim 1, comprising an energy storage means.

* * * * *